(12) United States Patent
Ishii et al.

(10) Patent No.: US 10,279,573 B2
(45) Date of Patent: May 7, 2019

(54) MANUFACTURING METHOD OF HONEYCOMB STRUCTURE, AND BONDING MATERIAL

(71) Applicant: NGK INSULATORS, LTD., Nagoya (JP)

(72) Inventors: Yutaka Ishii, Nagoya (JP); Kazunari Akita, Nagoya (JP); Yoshihiro Sato, Nagoya (JP); Masayuki Nate, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 17 days.

(21) Appl. No.: 15/297,488

(22) Filed: Oct. 19, 2016

(65) Prior Publication Data
US 2017/0036432 A1    Feb. 9, 2017

Related U.S. Application Data

(63) Continuation of application No. PCT/JP2016/060361, filed on Mar. 30, 2016.

(30) Foreign Application Priority Data

Mar. 31, 2015   (JP) ................................. 2015-074111

(51) Int. Cl.
*B32B 41/00* (2006.01)
*B32B 37/14* (2006.01)
(Continued)

(52) U.S. Cl.
CPC ............ *B32B 37/146* (2013.01); *B28B 1/002* (2013.01); *B28B 19/0038* (2013.01);
(Continued)

(58) Field of Classification Search
CPC ....... B32B 37/146; B32B 37/10; B32B 37/06; B32B 2255/00; C04B 38/10;
(Continued)

(56) References Cited

U.S. PATENT DOCUMENTS 7,947,103 B2   5/2011   Masukawa et al.
8,480,781 B2   7/2013   Cai et al.
(Continued)

FOREIGN PATENT DOCUMENTS

EP   1 930 061 A2   6/2008
JP   11-164877 A1   6/1999
(Continued)

OTHER PUBLICATIONS

International Search Report and Written Opinion (Application No. PCT/JP2016/060361) dated Jun. 21, 2016.
(Continued)

*Primary Examiner* — Michael N Orlando
*Assistant Examiner* — Joshel Rivera
(74) *Attorney, Agent, or Firm* — Burr & Brown, PLLC

(57) ABSTRACT

A manufacturing method of a honeycomb structure includes a forming step of forming a quadrangular pillar-shaped honeycomb formed body, a firing step of firing the honeycomb formed body and forming a quadrangular pillar-shaped honeycomb fired body, a coating step of coating at least a part of side surfaces of the honeycomb fired body with a paste-like bonding material, a honeycomb block body preparing step of bonding the plurality of honeycomb fired bodies while performing pressurizing, to prepare a honeycomb block body, and a circumference grinding step of grinding a circumferential surface of the honeycomb block body and obtaining the honeycomb structure, and in the honeycomb block body preparing step, the bonding is performed without interposing any member other than the bonding material between the honeycomb fired bodies, and the bonding material has a shear thinning property.

7 Claims, 4 Drawing Sheets

(51) Int. Cl.
- *B32B 37/06* (2006.01)
- *B32B 37/10* (2006.01)
- *C04B 35/565* (2006.01)
- *C04B 38/00* (2006.01)
- *C04B 38/10* (2006.01)
- *B28B 1/00* (2006.01)
- *B28B 19/00* (2006.01)
- *C04B 28/24* (2006.01)
- *C04B 35/195* (2006.01)
- *C04B 35/478* (2006.01)
- *C04B 37/00* (2006.01)

(52) U.S. Cl.
CPC .............. *B32B 37/06* (2013.01); *B32B 37/10* (2013.01); *C04B 28/24* (2013.01); *C04B 35/195* (2013.01); *C04B 35/478* (2013.01); *C04B 35/565* (2013.01); *C04B 37/005* (2013.01); *C04B 38/0006* (2013.01); *C04B 38/10* (2013.01); *B32B 2255/00* (2013.01); *C04B 2235/3206* (2013.01); *C04B 2235/3217* (2013.01); *C04B 2235/5216* (2013.01); *C04B 2237/04* (2013.01); *C04B 2237/083* (2013.01)

(58) Field of Classification Search
CPC ... C04B 35/565; C04B 38/0006; C04B 37/00; C04B 2235/3217; C04B 2235/5216; C04B 2235/3206
USPC ........................... 156/64, 350, 351, 378, 379
See application file for complete search history.

(56) References Cited

U.S. PATENT DOCUMENTS

| | | |
|---|---|---|
| 2004/0108056 A1 | 6/2004 | Fujita et al. |
| 2009/0029105 A1 | 1/2009 | Masukawa et al. |
| 2011/0236627 A1 | 9/2011 | Kanai |
| 2012/0110965 A1 | 5/2012 | Cai et al. |
| 2012/0207967 A1* | 8/2012 | Pyzik ................ B01D 46/2444 428/116 |

FOREIGN PATENT DOCUMENTS

| | | |
|---|---|---|
| JP | 2012-532082 A1 | 12/2012 |
| JP | 2014-201490 A1 | 10/2014 |
| WO | 03/031371 A1 | 4/2003 |
| WO | 2007/111056 A1 | 10/2007 |
| WO | 2011/008462 A1 | 1/2011 |
| WO | 2011/121712 A1 | 10/2011 |

OTHER PUBLICATIONS

Extended European Search Report, European Application No. 16772944.1, dated Dec. 8, 2017 (8 pages).

* cited by examiner

MANUFACTURING METHOD OF HONEYCOMB STRUCTURE, AND BONDING MATERIAL

BACKGROUND OF THE INVENTION

1. Field of the Invention

The present invention relates to a manufacturing method of a honeycomb structure, and a bonding material. More particularly, it relates to a manufacturing method of a large honeycomb structure manufactured by laminating a plurality of quadrangular pillar-shaped honeycomb fired bodies, and a bonding material for use in the manufacturing.

2. Description of Related Art

A ceramic honeycomb structure excellent in heat resistance and corrosion resistance has been employed as a carrier for a catalyst device or a filter for use in an environmental measure, collection of specific substances or the like in each of various fields of cars, chemistry, electric power, iron and steel, and the like. Particularly, in recent years, the honeycomb structure has formed a plugged honeycomb structure in which cell open ends of both end faces are alternately plugged, and has often been used as a diesel particulate filter (DPF) to trap a particulate matter discharged from a diesel engine or the like. Furthermore, as a material of the honeycomb structure for use at a high temperature under a corrosive gas atmosphere, silicon carbide (SiC), cordierite, aluminum titanate (AT) or the like which is excellent in heat resistance and chemical stability has suitably been used.

Among these materials, silicon carbide has a comparatively large thermal expansion coefficient, and hence when the honeycomb structure formed by using silicon carbide as aggregates is formed to have a large volume, defects might be generated due to thermal stress during the use. Furthermore, the defects might be generated due to the thermal stress when the trapped particulate matter is burned and removed. Therefore, in a case of manufacturing the honeycomb structure formed by using silicon carbide as the aggregates and having a predetermined size or more, a plurality of small quadrangular pillar-shaped plugged honeycomb segments (honeycomb fired bodies) are usually first prepared. Further, bonding surfaces (side surfaces) of these honeycomb segments are coated with a bonding material to bond the honeycomb segments to one another, thereby constructing one large honeycomb structure (see Patent Document 1).

CITATION LIST

Patent Documents

[Patent Document 1] WO 2003/31371

SUMMARY OF THE INVENTION

Problem to be Solved by the Invention

In the case of a manufacturing method of a honeycomb structure described in Patent Document 1, when bonding honeycomb segments, a spacer is disposed in a space between their side surfaces to decrease variations of a space between the honeycomb segments (a thickness of a bonding material). That is, the manufacturing method requires a step of disposing the spacer on the side surface of each honeycomb segment.

Furthermore, as a stage before applying (giving) the bonding material to the honeycomb segments, an undercoat treatment might be performed to the bonding surfaces of the honeycomb segments. In the undercoat treatment, a slurry including a ceramics component is applied to the bonding surfaces. In consequence, it is possible to inhibit "water in the bonding material from being absorbed by the honeycomb segments when applying the bonding material thereto", and it is possible to inhibit generation of defects such as peels of the bonding material in the honeycomb structure. That is, the manufacturing method requires a step of applying the slurry as an undercoat treating agent to the bonding surfaces.

In addition, when coating the side surfaces of the honeycomb segments with the bonding material to bond the honeycomb segments to one another, the bonding material is pushed out from the space between the side surfaces and discharged to an end face side of each honeycomb segment. At this time, the bonding material pushed outside adheres to the end faces, open end portions of cells are closed, and the end faces become dirty sometimes. To eliminate such problems, for the purpose of preventing the open end portions of the cells from being closed with the bonding material and being dirty, a mask treatment is performed to attach a film made of a resin to each end face beforehand, thereby covering the open end portions of the cells. That is, the manufacturing method requires a mask step of attaching the resin film to each end face and a peeling step of removing the film from the end face after the bonding.

The side surfaces are coated with the surplus bonding material so that a void is not generated between the honeycomb segments. Further, for the purpose of bonding the honeycomb segments, when the plurality of segments coated with the bonding material are compressed and bonded, the surplus bonding material is pushed out to end faces and side surfaces of a honeycomb bonded body. These surplus bonding materials pushed outside are removed by a manual operation using a spatula or the like.

By performing the respective steps of forming the spacer, performing the undercoat treatment to the bonding surfaces, attaching the film to protect each end face, removing the surplus bonding material pushed outside, and further peeling the film as described above, manufacturing time of the honeycomb structure lengthens, which has become a factor to disturb efficient manufacturing.

To eliminate such a problem, the present invention has been developed in view of the above actual situations, and an object thereof is to provide a manufacturing method of a honeycomb structure in which it is possible to omit steps concerned with formation of a spacer, an undercoat treatment, a mask treatment, removal of a surplus bonding material and the like and it is possible to efficiently manufacture the honeycomb structure, and a bonding material for use in the manufacturing method.

Means for Solving the Problem

According to the present invention, there are provided a manufacturing method to manufacture a honeycomb structure, and a bonding material for use in the manufacturing method.

According to a first aspect of the present invention, a manufacturing method of a honeycomb structure is provided which has a forming step of forming a forming material to form a quadrangular pillar-shaped honeycomb formed body having partition walls defining and forming a plurality of cells which become through channels for fluid and extend from one end face to the other end face; a firing step of firing the honeycomb formed body obtained by the forming step and forming a quadrangular pillar-shaped honeycomb fired body; a coating step of coating a side surface of at least a part of the honeycomb fired body with a paste-like bonding material; a honeycomb block body preparing step of bringing the side surfaces of the plurality of honeycomb fired bodies into contact with one another and performing bonding while performing pressurizing, to prepare a honeycomb block body in which the plurality of honeycomb fired bodies are laminated; and a grinding step of grinding a circumferential portion of the honeycomb block body and obtaining the honeycomb structure, wherein in the honeycomb block body preparing step, the bonding is performed without interposing any member other than the bonding material between the honeycomb fired bodies, and the bonding material has a shear thinning property.

According to a second aspect of the present invention, the manufacturing method of the honeycomb structure according to the above first aspect is provided, wherein the coating step and the honeycomb block body preparing step are performed without performing a mask treatment on the end faces of the honeycomb fired body.

According to a third aspect of the present invention, the manufacturing method of the honeycomb structure according to the above first or second aspects is provided, wherein in the coating step, the side surface of the honeycomb fired body before coated with the bonding material is not coated with an undercoat material.

According to a fourth aspect of the present invention, the manufacturing method of the honeycomb structure according to any one of the above first to third aspects is provided, wherein a viscosity of the bonding material is from 1500 to 5000 poise.

According to a fifth aspect of the present invention, the manufacturing method of the honeycomb structure according to any one of the above first to fourth aspects is provided, wherein a thixotropic index indicating the shear thinning property of the bonding material is in a range of 18 to 30.

According to a sixth aspect of the present invention, the manufacturing method of the honeycomb structure according to any one of the above first to fifth aspects is provided, wherein the bonding material contains a thickener.

According to a seventh aspect of the present invention, the manufacturing method of the honeycomb structure according to the above sixth aspect is provided, wherein the thickener is at least one of xanthan gum, diutan gum, and Sumecton.

According to an eighth aspect of the present invention, the manufacturing method of the honeycomb structure according to any one of the above first to seventh aspects is provided, wherein the bonding material contains at least two types of pore forming agents.

According to a ninth aspect of the present invention, a bonding material for use in the manufacturing method of the honeycomb structure according to any one of the above first to eighth aspects is provided, the bonding material including a thickener of at least one of xanthan gum, diutan gum, and Sumecton.

According to a tenth aspect of the present invention, the bonding material according to the above ninth aspect is provided, wherein a thixotropic index indicating the shear thinning property of the bonding material is in a range of 18 to 30.

Effect of the Invention

According to a manufacturing method of a honeycomb structure, and a bonding material of the present invention, pressurizing and bonding of honeycomb fired bodies (honeycomb segments) are performed by using a bonding material having a shear thinning property, and hence it is possible to easily remove the bonding material pushed out from end face sides a space between side surface sides of side surfaces of the honeycomb fired body without making the end faces dirty.

As a result, it is possible to omit respective steps of formation of a spacer, an undercoat treatment, a removing treatment of a surplus bonding material pushed outside, a mask treatment and the like which have been performed in a conventional manufacturing method of the honeycomb structure, and it is possible to efficiently manufacture the honeycomb structure. The bonding material is usable in the manufacturing method.

Here, "the shear thinning property" indicates characteristics that when a shearing force is applied, a viscosity decreases and fluidity improves and that when the shearing force is not applied any more, the viscosity increases and solidification occurs. The characteristics of the shear thinning property can be represented by, for example, a value of a thixotropic index (the Ti value). By appropriately controlling the fluidity of the bonding material by use of the characteristics of the shear thinning property (thixotropy), it is possible to perform the manufacturing method of the honeycomb structure of the present invention. The characteristics are not limited to the bonding material of the present invention, and are also applicable to, for example, a plugging material or a circumference coating material of the honeycomb structure. This shear thinning property is obtainable by appropriately adding a thickener to various materials.

DETAILED DESCRIPTION OF THE INVENTION

Hereinafter, embodiments of a manufacturing method of a honeycomb structure of the present invention, and a bonding material will be described with reference to the drawings, respectively. The present invention is not limited to the following embodiments, and changes, modifications, improvements and the like are addable without departing from the gist of the present invention.

Figure 1:
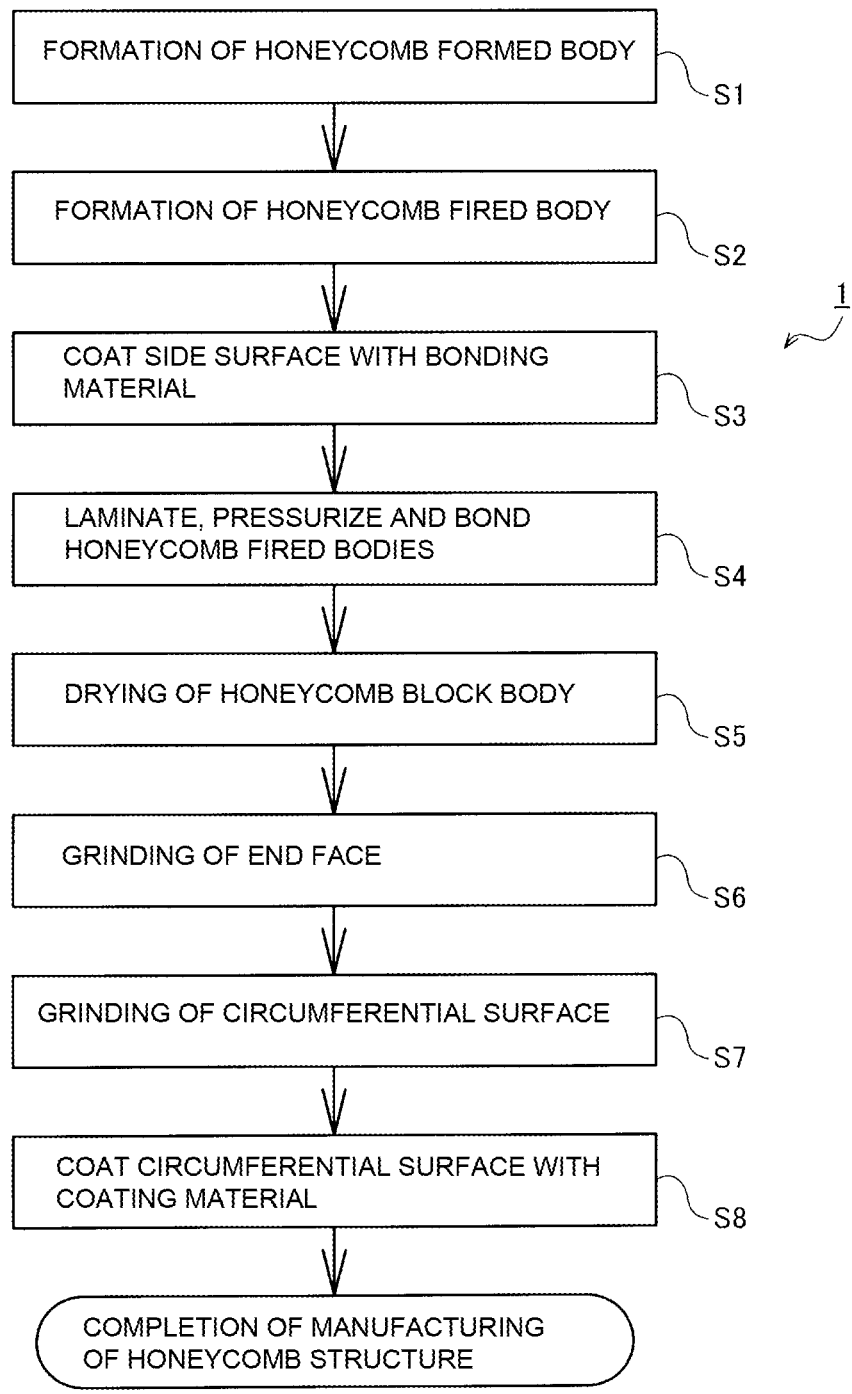
FIG. 1 is a flowchart showing a flow of a manufacturing method of a honeycomb structure of one embodiment of the present invention.

A manufacturing method 1 of a honeycomb structure of one embodiment of the present invention (hereinafter referred to simply as "the manufacturing method 1") has a forming step S1, a firing step S2, a coating step S3, and a honeycomb block body preparing step S4 as shown in FIG. 1.

Furthermore, the manufacturing method includes, as another constitution, a drying step S5 of drying a formed honeycomb block body 10, an end face grinding step S6 of grinding and processing an end face 11 of the dried honeycomb block body 10, a circumference grinding step S7 of grinding and processing a circumferential surface 12 that is a circumferential portion of the honeycomb block body 10, and a circumference coating step S8 of coating the ground circumferential surface 12 with a coating material.

According to the manufacturing method 1 of the present embodiment, in the coating step S3, at least a part of a side surface 21a and a side surface 21b orthogonal to the side surface 21a is coated with a paste-like bonding material 30 in a predetermined coating thickness to pressurize and bond a plurality of honeycomb fired bodies 20 formed into a quadrangular pillar-shaped shape. In the bonding material 30, a shear thinning property is beforehand adjusted, and the bonding material is particularly set to a high viscosity under a low shearing force as compared with a conventional bonding material. As a result, the bonding material does not adhere to an end face 22 of the honeycomb fired body 20 to which the shearing force is not added, and can easily be removed.

Therefore, in a case of combining the plurality of quadrangular pillar-shaped honeycomb fired bodies 20 to form the honeycomb block body 10, even when pushing the bonding material 30 toward an end face 22 side and a bonded body side surface 25 from a clearance 23 formed between the mutually facing side surfaces 21a (or the side surfaces 21b) which come into contact with each other, the bonding material solidifies when pushed outside, so that it is possible to inhibit subsequent protrusion and to heighten a bonding material filling degree of a bonding surface and to inhibit generation of a void.

Therefore, it is possible to decrease a coating amount of the bonding material, and as a result, it is possible to noticeably decrease a protruding amount. The protruding bonding material solidifies on the spot, and the end face 22 does not become dirty, and furthermore, the protruding amount is also small, it is therefore not necessary to remove the protruding bonding material prior to the drying, and it is possible to remove the bonding material simultaneously with a cutting portion of the honeycomb structure by end face grinding and circumference grinding.

Figure 2:
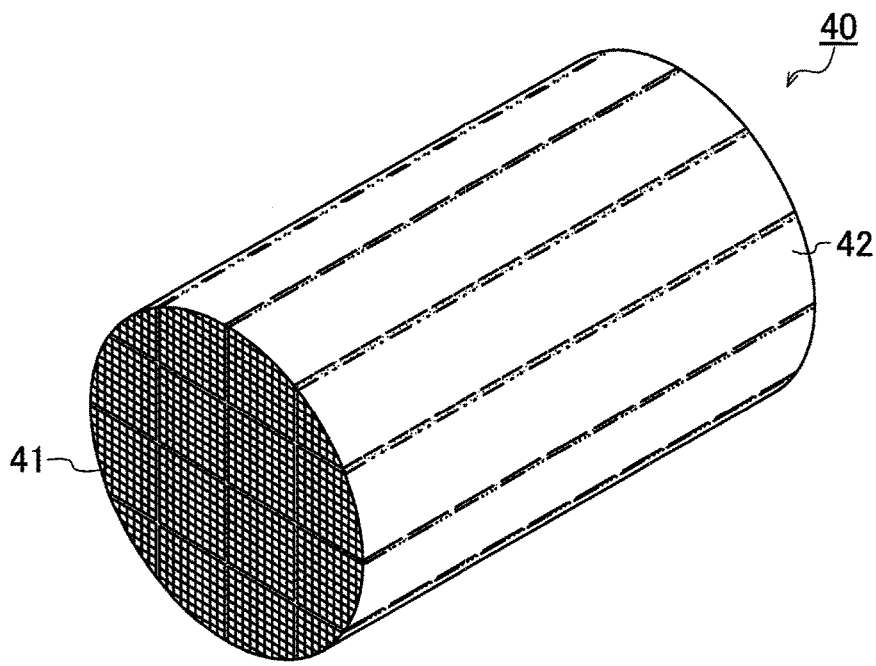
FIG. 2 is a perspective view schematically showing one example of the honeycomb structure.

After forming the honeycomb block body 10 by use of the bonding material 30, it is possible to prepare a substantially round pillar-shaped honeycomb structure 40 as shown in FIG. 2, through respective steps of the drying, end face grinding, circumference grinding, circumference coating and the like. That is, as compared with a conventional manufacturing method of the honeycomb structure, the bonding material 30 having the shear thinning property as in the present embodiment is used in the coating step S3. Consequently, an operation of forming a spacer that is a member other than the bonding material 30 is not required, it is not necessary to perform an undercoat treatment of coating the respective side surfaces 21a and 21b of the honeycomb fired body 20 with an undercoat material, and there are not required a mask treatment of attaching, to the end face 22, a film or the like to protect cells 24 of the end face 22 of the honeycomb fired body 20, a removing treatment of the protruding bonding material, and a peeling treatment of peeling the film.

Consequently, in the manufacturing method 1 of the honeycomb structure 40, it is possible to omit five steps. As a result, it is possible to improve a manufacturing efficiency of the honeycomb structure 40 and it is possible to stably manufacture the honeycomb structure 40. Hereinafter, details of the respective steps and effects of the present invention will be described with reference to FIG. 1 to FIG. 6.

(1) Forming Step S1:

A binder, a surfactant, a pore former, water and the like are added to a ceramic raw material to prepare a forming material. As the ceramic raw material, there is selected at least one selected from the group consisting of heretofore well known silicon carbide, a silicon-silicon carbide based composite material, a cordierite forming raw material, cordierite, mullite, alumina, titania, spinel, a silicon carbide-cordierite based raw material, lithium aluminum silicate, aluminum titanate, and an iron-chromium-aluminum based alloy. In particular, use of silicon-silicon carbide based composite material is suitable.

The cordierite forming raw material (cordierite particles) is blended to satisfy a chemical composition in which silica is in a range of 42 to 56 parts by mass, alumina is in a range of 30 to 45 parts by mass, and magnesia is in a range of 12 to 16 parts by mass, and the raw material is fired to become cordierite. It is to be noted that in a case of using the silicon-silicon carbide based composite material as the ceramic raw material, a mixture of silicon carbide powder and metal silicon powder is used.

On the other hand, examples of the binder include methylcellulose, hydroxypropoxyl cellulose, hydroxyethyl cellulose, carboxymethyl cellulose, and polyvinyl alcohol. In particular, it is suitable to use methylcellulose and hydroxypropoxyl cellulose together. Furthermore, as to a content of the binder, it is preferable to contain 3 to 15 parts by mass of the binder to 100 parts by mass of the ceramic raw material, and it is to be noted that as to a content of the water, it is preferable to contain 20 to 90 parts by mass of the water to 100 parts by mass of the ceramic raw material.

In the surfactant, it is possible to use ethylene glycol, dextrin, fatty acid soap, polyalcohol or the like. It is to be noted that for the surfactant, one may be selected from the above group and used alone, or two or more may suitably be combined for use.

There is not any special restriction on a pore forming agent, as long as the agent becomes pores after fired, and examples of the agent can include starch, a foamable resin, a water absorbable resin, silica gel, and carbon. A content of the pore forming agent is preferably from 0 to 45 parts by mass to 100 parts by mass of the ceramic raw material.

By using the forming material prepared by mixing the above components, a quadrangular pillar-shaped honeycomb formed body is formed in which a shape of a cross section orthogonal to a central axis is rectangular. Here, the number of the honeycomb formed bodies to be formed is suitably set in accordance with a shape and a size of the honeycomb structure 40 to be prepared (see FIG. 2). Furthermore, the plurality of honeycomb formed bodies to be formed preferably have the same shape.

First, the forming material is kneaded to obtain a kneaded material. Here, there is not any special restriction on a forming method of the kneaded material, and a well-known kneading device such as a kneader or a vacuum pugmill is usable. The honeycomb formed body is formed by extruding the kneaded material from a die prepared into a desirable shape at a predetermined pressure.

The honeycomb formed body includes a plurality of partition walls defining and forming a plurality of cells which become through channels for fluid and extend from one end face to the other end face, and the cross section orthogonal to the central axis (a surface orthogonal to a cell extending direction) possesses a quadrangular pillar-shaped shape of a rectangular shape. The cross section orthogonal to the central axis is especially suitably square. Furthermore, it is possible to employ a heretofore known kneaded material forming technique except for the above extrusion. A cell shape, partition wall thickness, cell density and the like of the honeycomb formed body are not especially limited, and can optionally be set.

Afterward, the formed honeycomb formed body is dried. There is not any special restriction on a drying method, and there are suitably combinable and usable well-known drying methods of an electromagnetic heating system of microwave heating drying, high-frequency induction heating drying and the like, and an external heating system of hot air drying, superheated steam drying and the like.

In the case of the honeycomb formed body, after rapidly and evenly drying the whole body, and, for example, drying a predetermined amount of water (e.g., 30 to 95 parts by mass of the above water amount) by the electromagnetic heating system to prevent generation of cracks, the remaining water is dried by the external heating system, so that the water content can be 3 or less parts by mass to the whole mass. In the electromagnetic wave heating system, the induction drying heating is especially suitable, and in the external heating system, the hot air drying is suitable. Furthermore, there is not any special restriction on a drying temperature, but the temperature is, for example, from 90 to 180° C., and it is preferable that drying time is from 1 to 10 h.

To the formed honeycomb formed body, plugging portions may be formed in open ends of cells in one end face and open ends of the residual cells in the other end face. In consequence, it is possible to obtain the honeycomb formed body in which the plugging portions are alternately arranged in each end face. Thus, in a case of forming the plugging portions in the honeycomb formed body, the honeycomb structure 40 to be manufactured becomes "a plugged honeycomb structure". It is to be noted that there is not any special restriction on a method of forming the plugging portions in the honeycomb formed body, and it is possible to employ a well-known technique.

Figure 3:
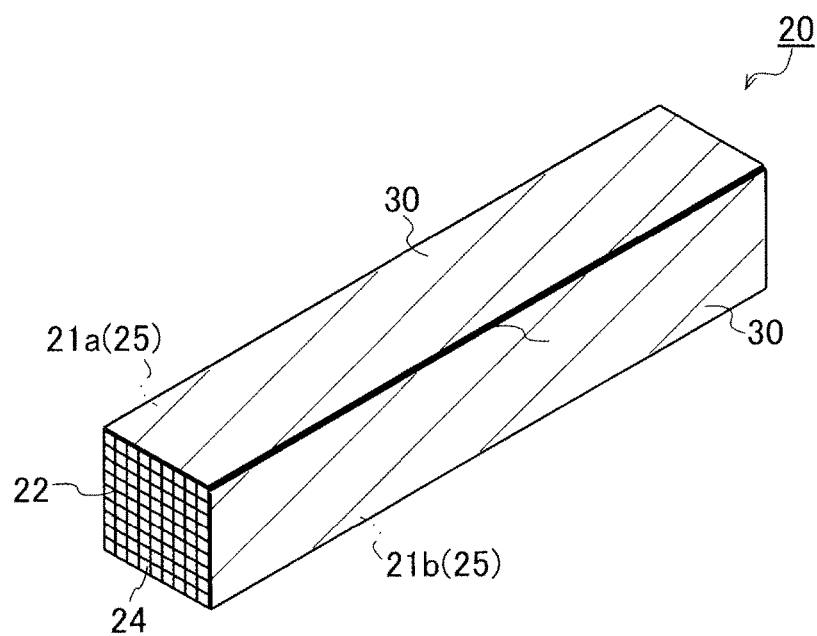
FIG. 3 is a perspective view schematically showing one example of a quadrangular pillar-shaped honeycomb fired body whose side surfaces are coated with a bonding material.

(2) Firing Step S2:

Next, the obtained honeycomb formed body is fired to form the quadrangular pillar-shaped honeycomb fired body 20 (see FIG. 3). In the firing step S2, it is desirable to perform the firing after performing degreasing (calcinating) to remove the binder and the like included in the forming material. In the calcinating, for example, heating is performed in a temperature range of 400 to 500° C. under the atmosphere for 0.5 to 20 hours. It is to be noted that there is not any special restriction on a calcinating and firing technique, and a well-known electric furnace, a gas furnace or the like is usable. During the firing, for example, in a case of silicon carbide or the silicon-silicon carbide based composite material, the heating is performed in a temperature range of 1300 to 1500° C. for 1 to 10 hours.

(3) Coating Step S3:

Next, as to the quadrangular pillar-shaped honeycomb fired body 20 obtained by the firing step S2, at least a part of the side surface 21a (or the side surface 21b) is evenly coated with the paste-like bonding material 30 having the beforehand adjusted shear thinning property in a predetermined thickness (see FIG. 3). FIG. 3 illustrates that both one side surface 21a of the honeycomb fired body 20 and the side surface 21b orthogonal to the side surface are coated with the bonding material 30.

The coating with the bonding material 30 is performed by moving a coating nozzle along a central axis direction of the honeycomb fired body 20 while pushing the bonding material 30 out from the coating nozzle having a nozzle port opened in a predetermined width (e.g., matching a width of the honeycomb fired body 20) at a constant pressure. Consequently, the side surfaces 21a and 21b can be coated with the bonding material 30 in a uniform thickness. In this case, it is not necessary to perform the mask treatment of attaching, to the end face, the film to protect the end face 22 of the honeycomb fired body 20.

The bonding material 30 contains the ceramic raw material that becomes a base, water, the pore forming agent, an inorganic binder, an organic binder, a dispersing agent, and a shear thinning property imparting agent. In the ceramic raw material, it is possible to use about the same components as those for use as the above-mentioned forming material of the honeycomb formed body. For example, there are usable silicon carbide, the silicon-silicon carbide based composite material, the cordierite forming raw material, alumina and the like.

To 100 parts by mass of the bonding material, it is possible to use 50 to 70 parts by mass of these ceramic raw materials. Furthermore, as the inorganic binder, for example, silica sol, alumina sol or the like is utilizable, and as the organic binder, for example, methylcellulose, cellulose, PVA, PVB, a water absorbable resin and the like are utilizable. These binders are introduced mainly for the purpose of improving strength of the bonding material 30. It is possible to contain 15 to 25 parts by mass of the inorganic binder and 0.1 to 2 parts by mass of the organic binder to 100 parts by mass of the bonding material.

The bonding material 30 in the manufacturing method 1 of the present embodiment is characterized by containing the shear thinning property imparting agent as compared with the conventional bonding material. This shear thinning property imparting agent is typically a thickener, at least one of xanthan gum, diutan gum, and Sumecton (i.e., a synthetic inorganic polymer with a saponite structure) is used as an appropriate thickener, and a content of the thickener is from 0.1 to 1.0 part by mass to 100 parts by mass of externally additive water. Consequently, it is possible to impart the shear thinning property as compared with the conventional bonding material.

Furthermore, the adding of xanthan gum or the like produces an effect of solating water in the bonding material 30. In the case of the bonding material 30 obtained by solating the water, even when the bonding material 30 adheres to the end face 22 of the honeycomb fired body 20, it is possible to easily remove the bonding material from the end face 22 due to high viscosity, and there decreases the fear that the bonding material 30 (or a part thereof) remains in the end face 22. In addition, due to the solation of the water in the bonding material 30, the water in the bonding material 30 is hard to be penetrated or absorbed in a plurality of pores formed in the end face 22 of the honeycomb fired body 20. Therefore, it is possible to eliminate generation of the disadvantage that the end face 22 becomes dirty or the like due to the adhesion of the bonding material 30.

The bonding material 30 for use in the manufacturing method 1 indicates a viscosity of 1500 to 5000 poise. The viscosity is further preferably from 2000 to 3000 poise. Additionally, the viscosity was measured in a state of ambient temperature on conditions that measuring time was set to 60 s and a rotor rotating speed was set to 10 rpm, by use of a commercially available B type rotary viscometer (TOKI VISCOMETER TVB-10: manufactured by TOKI SANGYO CO. LTD.) and H7 rotor. In a case where the viscosity of the bonding material is lower than 1500 poise, fluidity of the bonding material heightens, and it is difficult to remove the bonding material adhered to the end face 22 of the honeycomb fired body 20. As a result, there increases the possibility that the cells 24 of the honeycomb fired body 20 (cells 41 of the honeycomb structure 40) are closed by the bonding material. Here, characteristic evaluation of the bonding material 30 by use of the B type rotary viscometer is defined as evaluation A in the present description.

On the other hand, in a case where the viscosity of the bonding material is in excess of 5000 poise, the fluidity of the bonding material remarkably decreases. As a result, it is not possible to suitably coat the side surfaces 21a and 21b of the honeycomb fired body 20 with the bonding material. Specifically, in a coating device for the coating with the bonding material, it is necessary to supply the bonding material from a storage tank (not shown) which stores the bonding material to the nozzle port opened in a tip of the coating nozzle at a strong pressure against the viscosity of the bonding material, and it is necessary to set a supply pressure to be higher than that of the conventional bonding material. In addition, there has been the high possibility that a supplying pipe connecting the coating nozzle to the storage tank and a collecting pipe to collect the non-coating bonding material which does not coat the side surfaces 21a and 21b for reuse into the storage tank are clogged with the high-viscosity bonding material. Therefore, a mechanism concerned with the supply and collection of the bonding material has been increased in size, and there has been the possibility that a supply mechanism and circulation mechanism of the bonding material by a pump are noticeably influenced. To eliminate such problems, in the manufacturing method 1 of the present embodiment, the bonding material 30 is adjusted into the viscosity stipulated into the above viscosity range.

It is to be noted that in the manufacturing method 1 of the present embodiment, the characteristics of the bonding material 30 may be evaluated on the basis of a value (a thixotropic index: the Ti value) of the shear thinning property. At this time, an evaluating method of the thixotropic index indicating the shear thinning property may be one of an evaluation program (evaluation B) of gradually changing a shearing speed and evaluating the index from a hysteresis curve on the basis of a value of a static viscosity and a value of a yield point and an evaluation program (evaluation C) of evaluating the index from creep recovery in which a constant shearing speed changes in stages.

Here, in the case of the evaluation B, the index is calculated on the basis of the value of the static viscosity and the viscosity of the yield point, for example, by gradually changing the shearing speed (a shear ratio) from 0 ($s^{-1}$) to 5 ($s^{-1}$) or by gradually changing the speed from 5 ($s^{-1}$) to 0 ($s^{-1}$). On the other hand, in the case of the evaluation C, there is performed an operation of continuing a state of setting the shearing speed (the shear ratio) to 0.3 ($s^{-1}$) for a predetermined time, momentarily changing the shearing speed to 10 ($s^{-1}$), further continuing 10 ($s^{-1}$) for a predetermined time, and momentarily returning the speed to 0.3 ($s^{-1}$) again.

In the manufacturing method 1 of the present embodiment, in a case of especially employing the above technique of the evaluation C, it is determined that the thixotropic index (the Ti value) of the bonding material 30 is adjusted into a range of 18 to 30. Here, the creep recovery is a phenomenon that in a case of continuously giving constant stress to an article, when a viscoelastic behavior that is a behavior of both a solid (elasticity) and a liquid (viscosity) proceeds for a certain time, the stress is momentarily removed, thereby gradually decreasing deformation that appears in the article with elapse of time. In the case of the manufacturing method 1 of the present embodiment, as described above, the behavior corresponds to a behavior of a case where the constant shearing speed continues for a predetermined time and momentarily changes to another shearing speed. By employing the technique of the evaluation C, it is possible to eliminate variations of the Ti value as compared with the evaluation B.

Further specifically, the thixotropic index (a shear thinning index) is a phenomenon that the viscosity decreases in accordance with the shearing speed. That is, in a case of "shearing" the liquid, the fluidity of the liquid increases and the viscosity decreases in the phenomenon. Here, the thixotropic indexes (the Ti values) in the case of the evaluation B and in the case of the evaluation C are calculated on the basis of Equation (1) and Equation (2) described below, respectively. In Equation (1) and Equation (2), Ti indicates the thixotropic index, $D_1$ and $D_2$ indicate the shear ratios ($s^{-1}$) (or the shearing speeds ($s^{-1}$)) before and after the change, and $\eta_1$ and $\eta_2$ indicate the viscosities (mPa·s) before and after the change in $D_1$ and $D_2$.

$$Ti = \eta_1/\eta_2 \quad \text{Equation (1):}$$

$$Ti = [\log(\eta_1/\eta_2)]/[\log(D_1/D_2)] \quad \text{Equation (2):}$$

On the other hand, as the pore forming agent included in the bonding material 30, about the same agent as the pore former for use in the forming material is usable. It is to be noted that in the manufacturing method 1 of the present embodiment, two types of pore forming agents, i.e., a type which is capable of forming fine pores and a type which is capable of forming comparatively large pores are suitably mixed and used. By use of two or more pore forming agents, it is possible to optionally adjust a porosity and a pore size of a portion of the bonding material 30 in the honeycomb structure. It is possible to contain 0.5 to 5 parts by mass of the pore forming agent to 100 parts by mass of the bonding material.

Due to the use of the bonding material 30 in which the above-mentioned shear thinning property is adjusted and water is solated, it is not necessary to beforehand perform the undercoat treatment to prevent the bonding material 30 from being absorbed in porous side surfaces of the honeycomb fired body 20, and it is not necessary to perform a spacer treatment of keeping a space between the mutually facing side surfaces of the honeycomb fired bodies 20 to be constant. That is, it is possible to omit steps concerned with the undercoat treatment and the spacer formation. Therefore, it is possible to decrease cost required for these steps and to efficiently manufacture the honeycomb structure.

Figure 4:
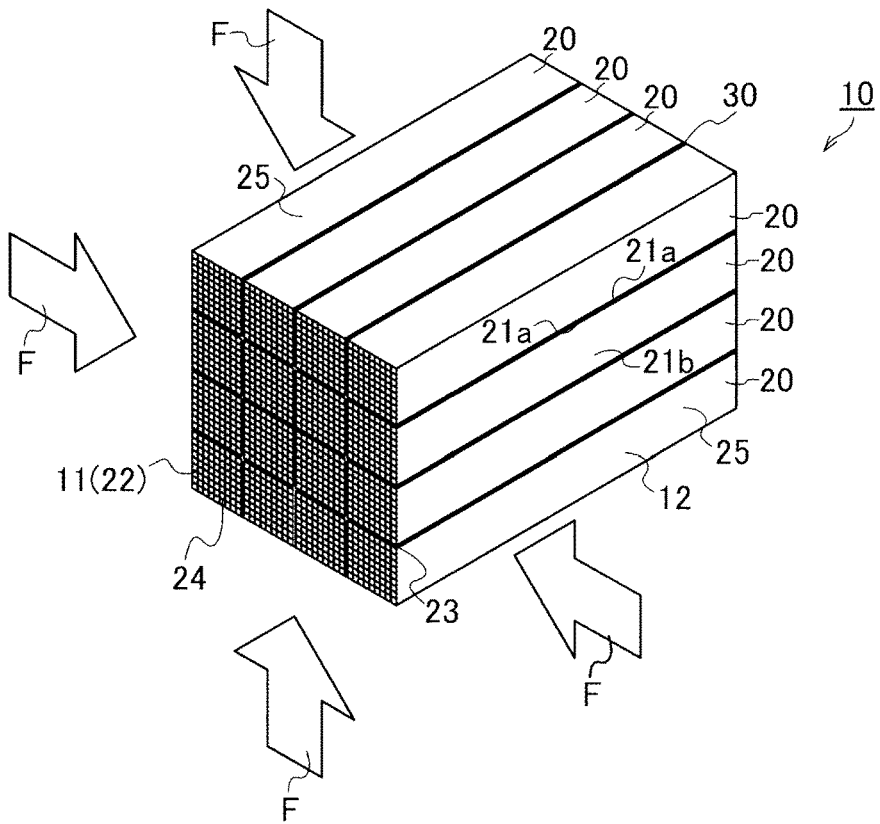
FIG. 4 is a perspective view schematically showing one example of a honeycomb block body.

(4) Honeycomb Block Body Preparing Step S4:

Next, the plurality of quadrangular pillar-shaped honeycomb fired bodies 20 are bonded to one another by use of the bonding material 30 which coats the side surfaces 21a and 21b, and the honeycomb block body 10 is formed in which the plurality of honeycomb fired bodies 20 are laminated as shown in FIG. 4. Here, when bonding the honeycomb fired bodies, at least one of the side surfaces 21a (or the side surfaces 21b) of the mutually facing honeycomb fired bodies 20 may be coated with the bonding material 30. In the manufacturing method 1 of the present embodiment, the honeycomb block body 10 was prepared in which there were laminated 16 quadrangular pillar-shaped honeycomb fired bodies 20 of 4 vertical bodies×4 horizontal bodies.

To further strengthen a state of bonding the plurality of honeycomb fired bodies 20, a pressurizing treatment to add a pressuring force F (see FIG. 4) from a predetermined direction is performed to the plurality of laminated honeycomb fired bodies 20. This can strengthen the mutual bonding of the vertically and horizontally adjacent honeycomb fired bodies 20. It is to be noted that there is not any special restriction on a pressurizing mechanism and a pressurizing device to the honeycomb fired bodies 20, and it is possible to employ, for example, a well-known pressurizing device of a hydraulic, pneumatic or electric cylinder or the like. Specifically, a pressing plate in the form of a flat plate (not shown) attached to a cylinder tip of the hydraulic cylinder or the like is used, and a predetermined pressurizing force is added to sandwich the laminated honeycomb fired bodies 20 between the pair of pressing plates from a mutually facing direction. It is to be noted that there is not any special restriction on the pressurizing force to be added to the honeycomb fired body 20, and the force can be adjusted into, for example, a pressurizing range of 1 to 20 MPa.

In a case where the pressurizing force is smaller than 1 MPa, close contact between the bonding material 30 and the honeycomb fired body 20 is not sufficient, and a strong bonding force is not generated. As a result, peeling or the like occurs in the vicinity of a boundary between the bonding material 30 and the honeycomb fired body 20, and it is not possible to maintain a shape of the honeycomb block body 10. On the other hand, in a case where the pressure is larger than 20 MPa, there is the tendency that a space (the clearance 23) between the side surfaces 21a (or the side surfaces 21b) of the pair of honeycomb fired bodies 20 becomes thin. As a result, there is the possibility that the coating bonding material 30 is pushed out from the space between the side surfaces 21a (or the side surfaces 21b) of the honeycomb fired body 20 to the side of the end faces 11 and 22 and the bonded body side surface 25 more than necessary, thereby weakening the bonding force. Furthermore, the end faces 11 and 22 are easy to become dirty by the bonding material 30 pushed out to the end faces 11 and 22 side. It is to be noted that a distance (the clearance 23) between the side surfaces 21a of the honeycomb block bodies 10 adjacent to each other may be set to a range of, for example, 0.5 mm to 1.5 mm A coating amount (a coating thickness) of the bonding material 30 which coats the side surfaces 21a and 21b of the honeycomb fired body 20 is adjusted in consideration of the pressurizing force to obtain such a distance during the pressurizing and bonding.

In the above honeycomb block body preparing step S4, the paste-like bonding material 30 is interposed between the side surfaces 21a (or 21b) of the honeycomb fired bodies 20 facing each other to perform the pressurizing and bonding. At this time, the bonding material 30 between the side surfaces 21a and the like is pushed by the pressurizing, and exerts the bonding force while spreading along the side surface 21a and the like of the honeycomb fired body 20, to bond the mutually adjacent honeycomb fired bodies 20 to each other. At this time, a part of the coating bonding material 30 is pushed out from the space between the side surfaces 21a or the like to an end face 22 side.

Figure 5:
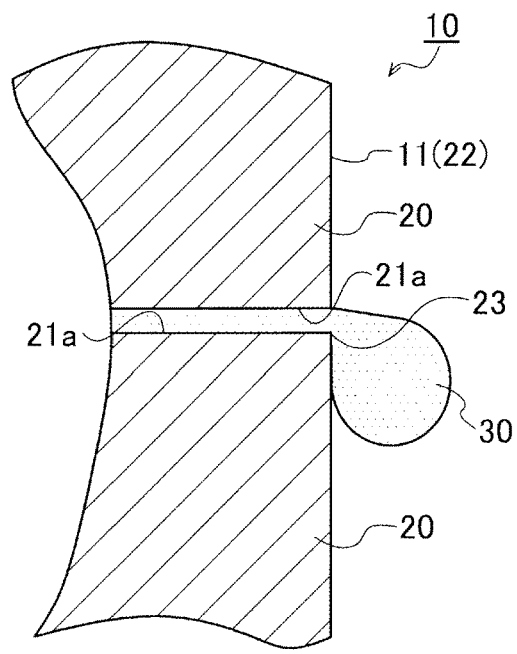
FIG. 5 is an enlarged cross-sectional view of the honeycomb block body schematically showing the bonding material pushed out from the side surface to an end face side.
Figure 6:
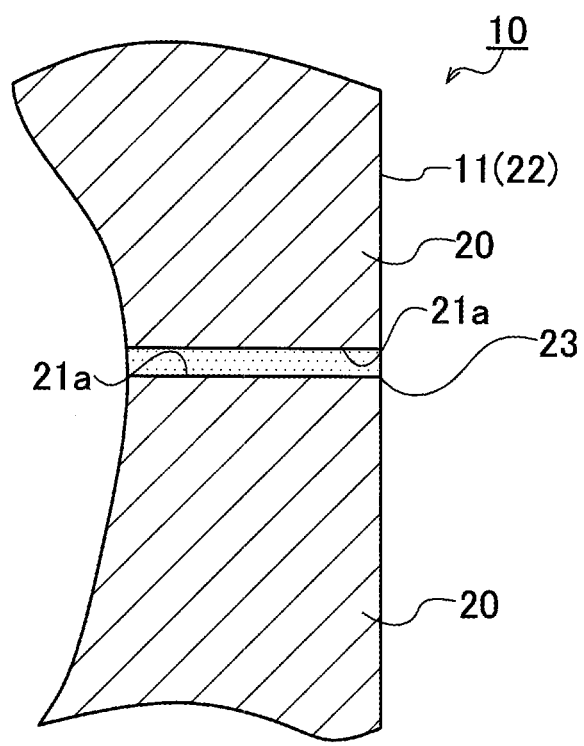
FIG. 6 is an enlarged cross-sectional view of the honeycomb block body schematically showing a state where the bonding material pushed outside is scraped.

Further, a part of the bonding material 30 pushed outside reaches the end face 22 and sags down from the clearance 23 between the side surfaces 21a or the like in accordance with a force of gravity (see FIG. 5). At this time, the bonding material 30 contains a thickener such as xanthan gum, and therefore has strong viscosity, and the bonding material does not perpendicularly drop downward at the moment of pushing out the bonding material from the end face 22, and sags from a pushout region (the clearance 23) of the end face 22. At this time, as to the end face 22, a part of the bonding material 30 only comes in contact with the end face 22, and the bonding material 30 is not strongly pressed onto the end face 22. That is, the bonding material 30 is not pushed by adding a load thereto. The protruding bonding material solidifies, and hence it is not necessary to remove the bonding material immediately after the bonding. The bonding material is removed in a grinding step after the drying.

(5) Drying Step S5:

The honeycomb block body 10 formed by laminating, pressurizing and bonding the plurality of honeycomb fired bodies 20 is dried. For example, the honeycomb block body 10 is introduced into a predetermined drying furnace at a drying temperature of 80 to 140° C. for a drying time of 3 to 6 hours. It is to be noted that in the drying step S5, the end face 11 of the honeycomb block body 10 is dried beforehand at an end face drying temperature of 150 to 250° C., and then the whole honeycomb block body 10 may be dried on the above drying conditions. In consequence, the honeycomb block body 10 is completed in which the respective honeycomb fired bodies 20 strongly bond to one another. It is to be noted that the end face drying is performed to precedingly solidify the bonding material on the end face side, thereby preventing a sink mark from being generated in the bonding material on the end face side in the subsequent drying step.

(6) End Face Grinding Step S6:

Next, the end face 11 of the dried honeycomb block body 10 is ground. Here, a grinding depth to the end face 11 is, for example, from about 1 to 2 mm. Consequently, it is possible to completely remove the slightly remaining bonding material 30 or the like from the end face 11. It is to be noted that in the grinding to the end face 11, a cup type grinding wheel (not shown) disposed to face the end face 11 is used, and the cup type grinding wheel rotated at a predetermined number of rotations is gradually brought close to the end face 11. It is to be noted that a technique of the end face grinding, a grinding device for the end face grinding and the like are well known, and hence detailed description thereof is omitted herein. The bonding material 30 protruding to the end face 11 side of the honeycomb block body 10 is removed in the present step.

(7) Circumference Grinding Step S7:

Next, the circumferential surface 12 of the honeycomb block body 10 in the form of a block is ground to prepare the honeycomb structure 40 of a desirable shape. Here, grinding processing is performed to obtain the substantially round pillar-shaped honeycomb structure 40 as shown in FIG. 2. There is not any special restriction on the grinding of the circumferential surface 12, but the grinding is performed, for example, by using the grinding wheel in which diamond abrasive grains are embedded and by gradually grinding off the circumferential surface 12 while relatively rotating the honeycomb block body 10 and the grinding wheel. Furthermore, a shape of the honeycomb structure 40 prepared by the grinding is not limited to the above round pillar shape, and may be an elliptic pillar shape in which the cross section orthogonal to the central axis is elliptic, or the like. Furthermore, the size of the honeycomb structure 40 can optionally be set in accordance with a size of the honeycomb fired body 20 to be laminated and the number of the honeycomb fired bodies to be laminated. The bonding material protruding to a bonded body side surface 25 side of the honeycomb block body 10 is removed in the present step.

(8) Circumference Coating Step S8:

Afterward, the circumferential surface of the honeycomb structure 40 subjected to the circumference grinding step S7 is coated with the coating material (not shown), to form a circumference coating layer 42. It is to be noted that a constitution of the coating material and the circumference coating step S8 are well known, and hence detailed description thereof is omitted. In consequence, the manufacturing of the honeycomb structure 40 using the manufacturing method 1 of the present embodiment is completed.

EXAMPLES

Hereinafter, the present invention will further specifically be described in accordance with several examples, but the present invention is not limited to these examples. In Examples 1 to 19 mentioned below, there were changed an amount of a thickener of a bonding material for use during pressurizing and bonding of a plurality of honeycomb fired bodies 20, and a type of thickener. Furthermore, evaluation was performed in accordance with a shearing speed and a value of Young's modulus of each obtained honeycomb structure.

Examples 1 to 19

In Examples 1 to 8, there was used a bonding material 1 including alumina particles and cordierite particles or a bonding material 2 (details will be described later), and a content of xanthan gum for use as a thickener changed in a range of 0.06 part by mass to 0.60 part by mass. On the other hand, in Examples 9 to 11, a content of diutan gum for use as a thickener changed in a range of 0.06 part by mass to 0.60 part by mass. Furthermore, in Examples 12 and 13, a bonding material 3 (details will be described later) which did not include alumina particles and cordierite particles was used and a content of xanthan gum contained as a thickener was 0.24 part by mass, and in Examples 14 and 15, the bonding material 2 was used and a content of Sumecton for use as a thickener was 1.00 part by mass or 0.75 part by mass. In Examples 16 to 19, there was used a bonding material 4 (details will be described later) in which ratios of alumina particles and cordierite particles were different from those of the bonding material 1 and the bonding material 2, and as thickeners, two types of thickeners were included in which xanthan gum changed in a range of 0.08 part by mass to 0.24 part by mass, and furthermore, Sumecton changed in a range of 0.20 part by mass to 1.00 part by mass.

A bonding material including alumina particles and cordierite particles and further including 4 parts by mass of inorganic fibers is defined as the bonding material 1, and a bonding material including 8 parts by mass of inorganic fibers is defined as the bonding material 2. Furthermore, a bonding material which does not include alumina particles and cordierite particles is defined as the bonding material 3, and a bonding material in which ratios of alumina particles and cordierite particles are different from those of the bonding material 1 and the like and which includes 12 parts by mass of inorganic fibers is defined as the bonding material 4. Table 1 shows blend conditions of the bonding materials of Examples 1 to 19. A honeycomb structure 40 was manufactured by using these bonding materials. Table 2 shows manufacturing conditions (bonding conditions) of the honeycomb structure 40. Additionally, in Examples 1 to 19, there were not performed steps concerned with an undercoat treatment to a honeycomb fired body 20, spacer formation, and a mask treatment to protect an end face 22.

Comparative Examples 1 to 16

On the other hand, in Comparative Examples 1 to 8, a bonding material 1 or a bonding material 2 did not include, as a thickener, xanthan gum, diutan gum or Sumecton. Furthermore, in Comparative Examples 9 and 10, a content of xanthan gum contained in the bonding material 1 was 0.04 part by mass or 0.64 part by mass in terms of a ratio to water. In Comparative Examples 11 and 12, a bonding material did not include alumina particles and cordierite particles, and a content of xanthan gum contained as a thickener was 0.12 part by mass in terms of a ratio to water (a bonding material 3). In Comparative Examples 13 to 16, a bonding material 4 did not include a thickener. Table 1 shows blending conditions of the bonding materials of Comparative Examples 1 to 16. Honeycomb structures 40 were manufactured by using these bonding materials. Table 2 (Examples 1 to 19) and Table 3 (Comparative Examples 1 to 16) show manufacturing conditions (bonding conditions) of the honeycomb structure 40. Additionally, in Comparative Examples 1 to 4, a mask treatment to a honeycomb fired body 20 was performed. Furthermore, in Comparative Examples 1 to 8, spacer formation to a honeycomb fired body 20 was performed. Furthermore, in Comparative Examples 13 to 16, both a mask treatment and spacer formation to a honeycomb fired body 20 were performed.

TABLE 1

| Bonding material type | Total amount of inorganic particles (parts by mass) | Bonding material | | | | | | | | |
|---|---|---|---|---|---|---|---|---|---|---|
| | | Silicon carbide particles (parts by mass) | Alumina particles (parts by mass) | Cordierite particles (parts by mass) | Inorganic fibers (parts by mass) | Inorganic binder* (parts by mass) | Organic binder (parts by mass) | Water content (parts by mass) | Pore forming agent (parts by mass) | Dispersing agent (parts by mass) |
| Bonding material 1 | 72 | 46 | 8 | 7 | 4 | 18 | 1 | 23 | 3 | 1 |
| Bonding material 2 | 72 | 42 | 8 | 7 | 8 | 18 | 1 | 23 | 3 | 1 |
| Bonding material 3 | 67 | 33 | — | — | 28 | 17 | 1 | 30 | 1 | 1 |
| Bonding material 4 | 71 | 41 | 2 | 6 | 12 | 10 | 1 | 22 | 5 | 1 |

NOTE:
*only solid content (solid content concentration of 60%)

TABLE 2

| | Bonding material type | Thickener content (parts by mass) | | | Undercoat treatment | Mask treatment | Spacer |
|---|---|---|---|---|---|---|---|
| | | Xanthan gum | Diutan gum | Sumecton | Presence/ absence | Presence/ absence | Presence/ absence |
| Example 1 | Bonding material 1 | 0.12 | — | — | None | None | None |
| Example 2 | Bonding material 1 | 0.24 | — | — | None | None | None |
| Example 3 | Bonding material 1 | 0.36 | — | — | None | None | None |
| Example 4 | Bonding material 2 | 0.12 | — | — | None | None | None |
| Example 5 | Bonding material 2 | 0.24 | — | — | None | None | None |
| Example 6 | Bonding material 2 | 0.36 | — | — | None | None | None |
| Example 7 | Bonding material 1 | 0.06 | — | — | None | None | None |
| Example 8 | Bonding material 1 | 0.60 | — | — | None | None | None |
| Example 9 | Bonding material 1 | — | 0.06 | — | None | None | None |
| Example 10 | Bonding material 1 | — | 0.24 | — | None | None | None |
| Example 11 | Bonding material 1 | — | 0.60 | — | None | None | None |
| Example 12 | Bonding material 1 | 0.24 | — | — | None | None | None |
| Example 13 | Bonding material 3 | 0.24 | — | — | None | None | None |
| Example 14 | Bonding material 3 | — | — | 1.00 | None | None | None |
| Example 15 | Bonding material 2 | — | — | 0.75 | None | None | None |
| Example 16 | Bonding material 4 | 0.24 | — | 1.00 | None | None | Present |
| Example 17 | Bonding material 4 | 0.15 | — | 0.20 | None | None | Present |
| Example 18 | Bonding material 4 | 0.15 | — | 0.39 | None | None | Present |
| Example 19 | Bonding material 4 | 0.08 | — | 0.78 | None | None | Present |

| | End face drying temp. (°C.) | Drying temp. (°C.) | Pressurizing force (kg/cm$^2$) | Evaluation A viscometer) Viscosity/ poise | Evaluation B (Hysteresis) Ti value | Evaluation C (Creep) Ti value |
|---|---|---|---|---|---|---|
| Example 1 | 200 | 120 | 0.5 | 1850 | 8.1 | 19.2 |
| Example 2 | 200 | 120 | 0.5 | 2120 | 11.0 | 20.2 |
| Example 3 | 200 | 120 | 0.5 | 2560 | 22.4 | 22.1 |
| Example 4 | 200 | 120 | 0.5 | 1742 | 7.7 | 20.0 |
| Example 5 | 200 | 120 | 0.5 | 2010 | 10.0 | 20.1 |
| Example 6 | 200 | 120 | 0.5 | 2666 | 11.3 | 21.0 |
| Example 7 | 200 | 120 | 0.5 | 1620 | 7.7 | 19.0 |
| Example 8 | 200 | 120 | 0.5 | 4655 | 21.2 | 26.6 |
| Example 9 | 200 | 120 | 0.5 | 1550 | 7.6 | 18.8 |
| Example 10 | 200 | 120 | 0.5 | 2860 | 13.3 | 22.2 |
| Example 11 | 200 | 120 | 0.5 | 4230 | 21.6 | 25.0 |
| Example 12 | 200 | 120 | 0.5 | 2303 | 15.5 | 19.5 |
| Example 13 | 200 | 140 | 0.5 | 1680 | 13.0 | 18.9 |
| Example 14 | 200 | 80/100/140 | 0.4 | 2650 | 14.5 | 21.3 |
| Example 15 | 200 | 80/100/140 | 0.4 | 3250 | 19.9 | 24.0 |
| Example 16 | None | 80/100/140 | 0.4 | 3984 | 12.5 | 24.9 |
| Example 17 | None | 80/100/140 | 0.5 | 2287 | 10.3 | 23.4 |
| Example 18 | None | 80/100/140 | 0.5 | 2485 | 7.3 | 24.7 |
| Example 19 | None | 80/100/140 | 0.5 | 3669 | 16.7 | 26.5 |

TABLE 3

| | Bonding material type | Thickener content (parts by mass) | | | Undercoat treatment | Mask treatment | Spacer |
|---|---|---|---|---|---|---|---|
| | | Xanthan gum | Diutan gum | Sumecton | Presence/ absence | Presence/ absence | Presence/ absence |
| Comparative Example 1 | Bonding material 1 | — | — | — | None | Present | Present |
| Comparative Example 2 | Bonding material 2 | — | — | — | None | Present | Present |
| Comparative Example 3 | Bonding material 1 | — | — | — | None | Present | Present |
| Comparative Example 4 | Bonding material 2 | — | — | — | None | Present | Present |
| Comparative Example 5 | Bonding material 1 | — | — | — | None | None | Present |
| Comparative Example 6 | Bonding material 2 | — | — | — | None | None | Present |
| Comparative Example 7 | Bonding material 1 | — | — | — | None | None | Present |

TABLE 3-continued

| | | | | | | | |
|---|---|---|---|---|---|---|---|
| Comparative Example 8 | Bonding material 2 | — | — | — | None | None | Present |
| Comparative Example 9 | Bonding material 1 | 0.04 | — | — | None | None | None |
| Comparative Example 10 | Bonding material 1 | 0.64 | — | — | None | None | None |
| Comparative Example 11 | Bonding material 3 | 0.12 | — | — | None | None | None |
| Comparative Example 12 | Bonding material 3 | 0.12 | — | — | None | None | None |
| Comparative Example 13 | Bonding material 4 | — | — | — | None | Present | Present |
| Comparative Example 14 | Bonding material 4 | — | — | — | None | Present | Present |
| Comparative Example 15 | Bonding material 4 | — | — | — | None | Present | Present |
| Comparative Example 16 | Bonding material 4 | — | — | — | None | Present | Present |

| | End face drying temp. (° C.) | Drying temp. (° C.) | Pressurizing force (kg/cm$^2$) | Evaluation A (Rotary viscometer) Viscosity/poise | Evaluation B (Hysteresis) Ti value | Evaluation C (Creep) Ti value |
|---|---|---|---|---|---|---|
| Comparative Example 1 | 200 | 80/100/140 | 0.5 | 1142 | 4.7 | 14.5 |
| Comparative Example 2 | 200 | 80/100/140 | 0.5 | 1035 | 2.9 | 14.2 |
| Comparative Example 3 | 200 | 120 | 0.5 | 1159 | 3.2 | 13.8 |
| Comparative Example 4 | 200 | 120 | 0.5 | 1250 | 3.4 | 15.7 |
| Comparative Example 5 | 200 | 80/100/140 | 0.5 | 1340 | 3.6 | 14.6 |
| Comparative Example 6 | 200 | 80/100/140 | 0.5 | 1009 | 3.0 | 13.4 |
| Comparative Example 7 | 200 | 120 | 0.5 | 1289 | 3.1 | 13.5 |
| Comparative Example 8 | 200 | 120 | 0.5 | 1381 | 3.6 | 13.6 |
| Comparative Example 9 | 200 | 120 | 0.5 | 1420 | 7.7 | 7.2 |
| Comparative Example 10 | 200 | 120 | 0.5 | 5520 | 22.4 | — |
| Comparative Example 11 | 200 | 120 | 0.5 | 1475 | 8.1 | 17.6 |
| Comparative Example 12 | 200 | 140 | 0.5 | 1454 | 11.0 | 16.5 |
| Comparative Example 13 | None | 80/100/140 | 0.4 | 1134 | 4.5 | 12.9 |
| Comparative Example 14 | None | 120 | 0.5 | 1098 | 4.1 | 13.8 |
| Comparative Example 15 | 200 | 80/100/140 | 0.5 | 1100 | 3.6 | 13.4 |
| Comparative Example 16 | 200 | 120 | 0.5 | 1203 | 4.0 | 14.6 |

A honeycomb block body 10 was formed from quadrangular pillar-shaped honeycomb fired bodies 20 by use of each of bonding materials of Examples 1 to 19 and Comparative Examples 1 to 16, and such a round pillar-shaped honeycomb structure as shown in FIG. 2 was prepared through respective steps of drying, end face grinding, circumference grinding and circumference coating.

As to the obtained honeycomb structures, in Examples 1 to 19, scraping, chipping and mask peeling were not performed, and any defects such as end face dirt and end face cracks were not generated. Furthermore, as to each honeycomb structure, shearing strength and Young's modulus were measured by methods mentioned below. It is to be noted that the scraping is an operation of removing the bonding material protruding to the end faces or the side surfaces by use of a rubber spatula or the like, and the chipping is an operation of removing the bonding material remaining on the side surfaces by use of a metal spatula or the like after a bonded body is dried.

(Measurement of Shearing Strength and Young's Modulus)

From the honeycomb structure, two adjacent honeycomb fired bodies in a bonded state were cut out as they were, one honeycomb fired body was fixed, and a load was applied to the other honeycomb fired body from its long axis direction to perform the measurement. A maximum load when the two honeycomb fired bodies were divided by applying the load thereto was defined as a shearing strength. The Young's modulus was calculated from a relation between stress and a deformation amount in such a state.

A shearing strength of 200 kPa or more passes, and Young's modulus of 60 MPa or less passes. Table 4 mentioned below shows the results of measurement and calculation. According to this table, in the case of each of the honeycomb structures using the bonding materials of Examples 1 to 15, the shearing strength and Young's modulus satisfied the above acceptance standard. Therefore, it was confirmed that the honeycomb structure sufficiently had practicability. Furthermore, even in a case of using diutan gum or Sumecton as the thickener in place of xanthan gum (Examples 9 to 11 and Examples 14 and 15) or in a case of using the bonding material 3 which did not include an alumina raw material and a cordierite forming raw material, the practicability was confirmed.

in a case of adding xanthan gum as the thickener, the bonding material containing 0.04 part by mass of the thickener in terms of a ratio to water (Comparative Example 9) caused the end face dirt. That is, it has been confirmed that it is necessary to contain at least 0.06 part by mass as shown in Example 7. On the other hand, in the case where the content of the thickener was 0.64 part by mass or more (Comparative Example 10), the shearing strength was 195 kPa and did not satisfy the acceptance standard.

TABLE 4

|  | Treatment after bonding | | | Evaluation result | | | |
| --- | --- | --- | --- | --- | --- | --- | --- |
|  | Scraping Presence/ absence | Chipping Presence/ absence | Mask peeling Presence/ absence | End face dirt Presence/ absence | End face cracks Presence/ absence | Shearing strength (200 kPa≤) | Young's modulus (≤60 MPa) |
| Example 1 | None | None | None | None | None | 1104 | 44.0 |
| Example 2 | None | None | None | None | None | 1026 | 45.0 |
| Example 3 | None | None | None | None | None | 1065 | 42.5 |
| Example 4 | None | None | None | None | None | 1671 | 38.0 |
| Example 5 | None | None | None | None | None | 1579 | 30.0 |
| Example 6 | None | None | None | None | None | 1373 | 32.5 |
| Example 7 | None | None | None | None | None | 1200 | 50.0 |
| Example 8 | None | None | None | None | None | 430 | 41.2 |
| Example 9 | None | None | None | None | None | 1050 | 49.0 |
| Example 10 | None | None | None | None | None | 920 | 46.0 |
| Example 11 | None | None | None | None | None | 380 | 40.0 |
| Example 12 | None | None | None | None | None | 1100 | 41.0 |
| Example 13 | None | None | None | None | None | 1250 | 35.0 |
| Example 14 | None | None | None | None | None | 725 | 29.5 |
| Example 15 | None | None | None | None | None | 708 | 26.8 |
| Example 16 | None | None | None | None | None | 850 | 25.0 |
| Example 17 | None | None | None | None | None | 870 | 21.0 |
| Example 18 | None | None | None | None | None | 850 | 22.0 |
| Example 19 | None | None | None | None | None | 900 | 30.0 |
| Comparative Example 1 | Present | Present | Present | None | None | 1143 | 49.5 |
| Comparative Example 2 | Present | Present | Present | None | None | 1061 | 30.5 |
| Comparative Example 3 | Present | Present | Present | None | Present | 1050 | 60.0 |
| Comparative Example 4 | Present | Present | Present | None | Present | 1091 | 37.3 |
| Comparative Example 5 | Present | Present | Present | Present | None | 1101 | 41.2 |
| Comparative Example 6 | Present | Present | Present | Present | None | 1125 | 33.2 |
| Comparative Example 7 | Present | Present | Present | Present | Present | 1130 | 54.5 |
| Comparative Example 8 | Present | Present | Present | Present | Present | 1010 | 40.3 |
| Comparative Example 9 | None | None | None | Present | None | 1110 | 51.0 |
| Comparative Example 10 | None | None | None | None | None | 195 | 37.5 |
| Comparative Example 11 | None | None | None | Present | None | 1050 | 42.5 |
| Comparative Example 12 | None | None | None | Present | None | 1080 | 40.5 |
| Comparative Example 13 | Present | Present | Present | None | None | 800 | 20.0 |
| Comparative Example 14 | None | None | None | None | None | 830 | 21.5 |
| Comparative Example 15 | None | None | None | None | None | 880 | 23.0 |
| Comparative Example 16 | None | None | None | None | None | 840 | 25.0 |

On the other hand, in a case where the bonding materials did not include any thickeners as in Comparative Examples 1 to 8, scraping to the end faces and side surfaces and chipping of the side surfaces were required to remove the surplus bonding material, and defects such as end face dirt and end face cracks might be seen. On the other hand, even In a case of using xanthan gum as the thickener, it is necessary to adjust the content into 0.06 part by mass or more and 0.60 part by mass or less in terms of the ratio to water. On the other hand, in the case of the bonding material 3 which did not include the alumina particles and cordierite particles, when the content of xanthan gum was 0.12 parts by mass, a defect such as the end face dirt occurred. Therefore, it has been indicated that as in Examples 12 and 13, it is necessary to contain at least 0.24 part by mass of xanthan gum in terms of the ratio to water.

(Measurement of Viscosity, and Calculation of Thixotropic Index)

A viscosity of a bonding material was measured in a state of ambient temperature on conditions that a measurement time was set to 60 s and a rotor rotating speed was set to 10 rpm by use of a B type rotary viscometer (TOKI VISCOMETER TVB-10: manufactured by TOKI SANGYO CO. LTD. and using H7 rotor) (Evaluation A). Furthermore, thixotropic indexes (the Ti values) were calculated in the respective examples and comparative examples, by use of a viscosity measuring device (HAAKE VISCOMETER 550) manufactured by Thermo SCIENTIFIC Co. Additionally, by changing an evaluation program, there were performed an evaluating method (evaluation B) on the basis of a hysteresis curve and an evaluating method (evaluation C) on the basis of creep recovery, respectively, as described above. Table 4 shows the respective results. According to this table, it has been confirmed that when employing the evaluating method (the evaluation C) on the basis of the creep recovery to calculate the thixotropic index (the Ti value), it is possible to obtain a highly accurate Ti value without any variations. Additionally, in Comparative Example 10, a high viscosity was indicated, and hence it was not possible to perform calculation by the evaluation C with the above viscosity measuring device. Therefore, Table 4 omits the corresponding item.

INDUSTRIAL APPLICABILITY

A manufacturing method of a honeycomb structure of the present invention is usable to manufacture the honeycomb structure suitably utilizable as a carrier for a catalyst device or a filter in various fields of cars, chemistry, electric power, iron and steel, and the like. A bonding material of the present invention is utilizable to suitably bond honeycomb segments to one another when manufacturing the above honeycomb structure.

DESCRIPTION OF REFERENCE NUMERALS

1: manufacturing method (the manufacturing method of a honeycomb structure), 10: honeycomb block body, 11 and 22: end face, 12: circumferential surface (a circumferential portion), 20: honeycomb fired body, 21a and 21b: side surface, 23: clearance, 24 and 41: cell, 25: bonded body side surface, 30: bonding material, 40: honeycomb structure, 42: circumference coating layer, S1: forming step, S2: firing step, S3: coating step, S4: honeycomb block body preparing step, S5: drying step, S6: end face grinding step, S7: circumference grinding step, S8: circumference coating step, and F: pressurizing force.

The invention claimed is:

1. A manufacturing method of a honeycomb structure which comprises:
    a forming step of forming a forming material to form a quadrangular pillar honeycomb formed body having partition walls defining and forming a plurality of cells which become through channels for fluid and extend from one end face to the other end face;
    a firing step of firing the honeycomb formed body obtained by the forming step and forming a quadrangular pillar honeycomb fired body;
    a coating step of coating a side surface of at least a part of the honeycomb fired body with a paste bonding material;
    a honeycomb block body preparing step of bringing the side surfaces of the plurality of honeycomb fired bodies into contact with one another and performing bonding while performing pressurizing, to prepare a honeycomb block body in which the plurality of honeycomb fired bodies are laminated; and
    a grinding step of grinding a circumferential portion of the honeycomb block body and obtaining the honeycomb structure,
    wherein in the honeycomb block body preparing step, the bonding is performed without interposing any member other than the bonding material between the honeycomb fired bodies,
    wherein the bonding material contains a thickener, and
    wherein the bonding material has a shear thinning property and a viscosity of from 1500 to 5000 poise.

2. The manufacturing method of the honeycomb structure according to claim 1,
    wherein the coating step and the honeycomb block body preparing step are performed without performing a mask treatment on the end faces of the honeycomb fired body.

3. The manufacturing method of the honeycomb structure according to claim 1,
    wherein in the coating step, the side surface of the honeycomb fired body before coated with the bonding material is not coated with an undercoat material.

4. The manufacturing method of the honeycomb structure according to claim 1,
    wherein a thixotropic index indicating the shear thinning property of the bonding material is in a range of 18 to 30.

5. The manufacturing method of the honeycomb structure according to claim 1, wherein the bonding material contains at least two types of pore forming agents.

6. A bonding material for use in the manufacturing method of the honeycomb structure according to claim 1,
    wherein the thickener is at least one of xanthan gum, diutan gum, and a synthetic inorganic polymer with a saponite structure.

7. The bonding material according to claim 6,
    wherein a thixotropic index indicating the shear thinning property of the bonding material is in a range of 18 to 30.

* * * * *